(12) United States Patent
Liang et al.

(10) Patent No.: US 9,285,451 B2
(45) Date of Patent: Mar. 15, 2016

(54) LIGHT SOURCE DETERMINING APPARATUS, LIGHT SOURCE DETERMINING METHOD AND OPTICAL TRACKING APPARATUS

(75) Inventors: Chia-Cheun Liang, Hsin-Chu (TW);
Chao-Chien Huang, Hsin-Chu (TW);
Chi-Yang Huang, Hsin-Chu (TW);
Han-Ping Cheng, Hsin-Chu (TW)

(73) Assignee: PixArt Imaging Inc., Science-Based Industrial Park, Hsin-Chu (TW)

( * ) Notice: Subject to any disclaimer, the term of this patent is extended or adjusted under 35 U.S.C. 154(b) by 529 days.

(21) Appl. No.: 13/550,610

(22) Filed: Jul. 17, 2012

(65) Prior Publication Data
US 2013/0168538 A1    Jul. 4, 2013

(30) Foreign Application Priority Data

Dec. 28, 2011    (TW) .............................. 100149199 A

(51) Int. Cl.
*G01S 3/784*    (2006.01)
*G01S 3/781*    (2006.01)

(52) U.S. Cl.
CPC *G01S 3/784* (2013.01); *G01S 3/781* (2013.01)

(58) Field of Classification Search
CPC ............. G01J 3/51; G01J 3/26; G01J 3/0218; G01J 3/02; G01J 1/42; H01L 25/048; H01L 25/065
USPC ......... 250/205, 226, 221, 239, 216, 236, 332; 250/334, 338.1, 494.1, 495.1; 356/72, 73, 356/121–123, 218, 229, 230; 362/85, 362, 362/372, 543–546, 12, 210, 228, 230, 231, 362/236, 240, 481, 583; 315/155, 383
See application file for complete search history.

(56) References Cited

U.S. PATENT DOCUMENTS

| | | | |
|---|---|---|---|
| 6,028,516 A | 2/2000 | Murphey | |
| 6,515,275 B1 * | 2/2003 | Hunter et al. | 250/226 |
| 7,518,715 B1 * | 4/2009 | Hamilton et al. | 356/218 |
| 7,684,029 B2 * | 3/2010 | Tan et al. | 356/221 |
| 8,138,467 B2 * | 3/2012 | Kim et al. | 250/226 |
| 2007/0180254 A1 | 8/2007 | Schumann | |
| 2012/0170839 A1 * | 7/2012 | Yuan et al. | 382/165 |

FOREIGN PATENT DOCUMENTS

| | | |
|---|---|---|
| JP | 2007280876 | 10/2007 |
| TW | 563178 | 11/2003 |
| TW | 201111768 | 4/2011 |

* cited by examiner

*Primary Examiner* — Pascal M Bui Pho
*Assistant Examiner* — Don Williams
(74) *Attorney, Agent, or Firm* — Winston Hsu; Scott Margo

(57) ABSTRACT

A light source determining apparatus for determining if a light source is a specific type light source is disclosed. The light source determining apparatus comprises: a light filtering device, comprising at least one first region and at least one second region, wherein the first region can pass only light with a specific frequency, where the second region can pass not only light with the specific frequency but also light with other frequencies; and a determining unit, for determining if the light source is the specific type light source, according to luminosity that the light source respectively generates for the first region and the second region.

25 Claims, 5 Drawing Sheets

LIGHT SOURCE DETERMINING APPARATUS, LIGHT SOURCE DETERMINING METHOD AND OPTICAL TRACKING APPARATUS

BACKGROUND OF THE INVENTION

1. Field of the Invention

The present invention relates to a light source determining apparatus, a light source determining method and an optical tracking apparatus, and particularly relates to a light source determining apparatus, alight source determining method, and an optical tracking apparatus that can perform object tracking according to the light source determining result.

2. Description of the Prior Art

FIG. 1 is a schematic diagram illustrating how a noise light source interferes object tracking in the prior art. In the prior art, the optical tracking apparatus catches at least one image for the object to be tracked to compute the location or the displacement coordinate thereof. Such object can be regarded as a light source, which can emit light with specific frequency. Take FIG. 1 for example, the optical tracking apparatus is used for tracking the object 101 that can emit infrared light. However, other kinds of noise light sources such as light sources 103, 105, which might be environment light or fluorescent light, could be included in the images caught by the optical tracking apparatus. Such kinds of light sources may include light other than the infrared light, therefore affect the accuracy for the optical tracking apparatus to track the object 101.

SUMMARY OF THE INVENTION

One objective of the present invention is to provide a light source determining apparatus and a light source determining method that can determine specific type light source.

Another objective of the present invention is to provide an optical tracking apparatus that can perform object tracking according to a light source determining result.

Another embodiment of the present invention discloses alight source determining apparatus for determining if a light source is a specific type light source. The light source determining apparatus comprises: a light filtering device, comprising at least one first region and at least one second region, wherein the first region can pass only light with a specific frequency, where the second region can pass not only light with the specific frequency but also light with other frequencies; and a determining unit, for determining if the light source is the specific type light source, according to luminosity that the light source respectively generates for the first region and the second region.

Another embodiment of the present invention discloses an optical tracking apparatus for tracking an object providing light with a specific frequency. The optical tracking apparatus comprises: a housing; a lens, on the housing; a image sensing chip, for catching at least one image including object images for the object; a light filtering device, comprising at least one first region and at least one second region, wherein light passes through the first region and the second region to respectively generate a first region image area and a second region image area in the image caught by the image sensing chip, where the first region can pass only light with a specific frequency, and the second region can pass not only light with the specific frequency but also light with other frequencies; and a determining unit, for determining a location for the object image for the object in the image, according to luminosity for the first region image area and the second region image area.

Another embodiment of the present invention discloses a light source determining method for determining if a light source is a specific type light source. The light source comprises: classifying a light filtering device to at least one first region and at least one second region, wherein the first region can pass only light with a specific frequency, where the second region can pass not only light with the specific frequency but also light with other frequencies; and determining if the light source is the specific type light source, according to luminosity that the light source respectively generates for the first region and the second region.

Still another embodiment of the present invention discloses alight source determining apparatus for determining if a light source is a specific type light source. The light source determining apparatus comprises: a image sensing chip, comprising an image sensing matrix having at least one first region and at least one second region, wherein the first region can pass only light with a specific frequency, where the second region can pass not only light with the specific frequency but also light with other frequencies; and a determining unit, for determining if the light source is the specific type light source, according to luminosity that the light source respectively generates for the first region and the second region.

In view of above-mentioned embodiments, simple structure can be utilized to determine the light source type, to accurately track an object. Additionally, the light source type determining operation can be more effective via adjusting the image scanning frequency and scanning area.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ".

Figure 1:
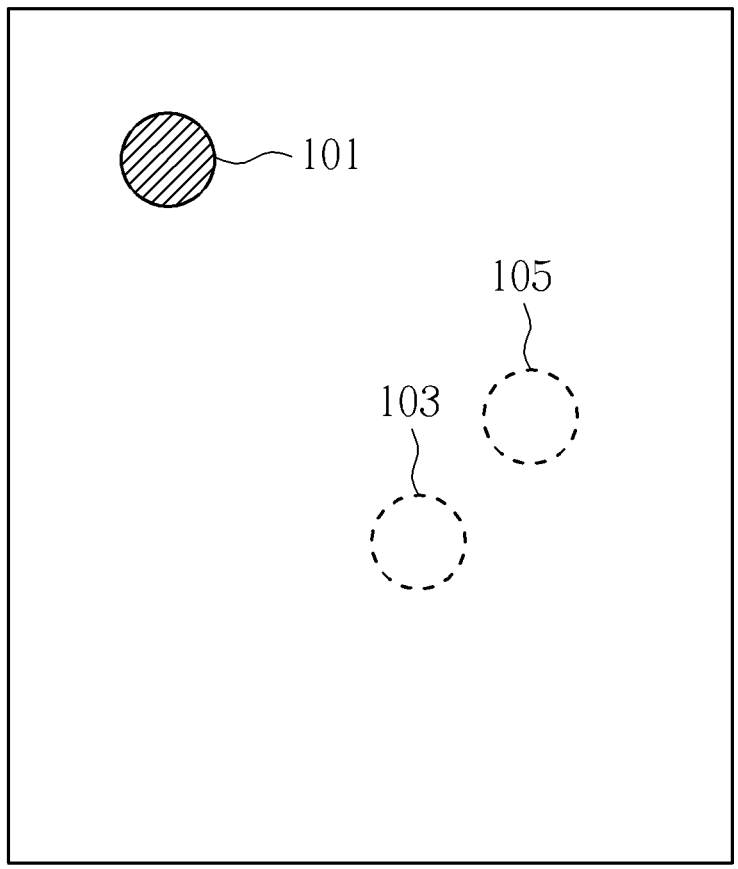
FIG. 1 is a schematic diagram illustrating how a noise light source interferes object tracking in the prior art.
Figure 2:
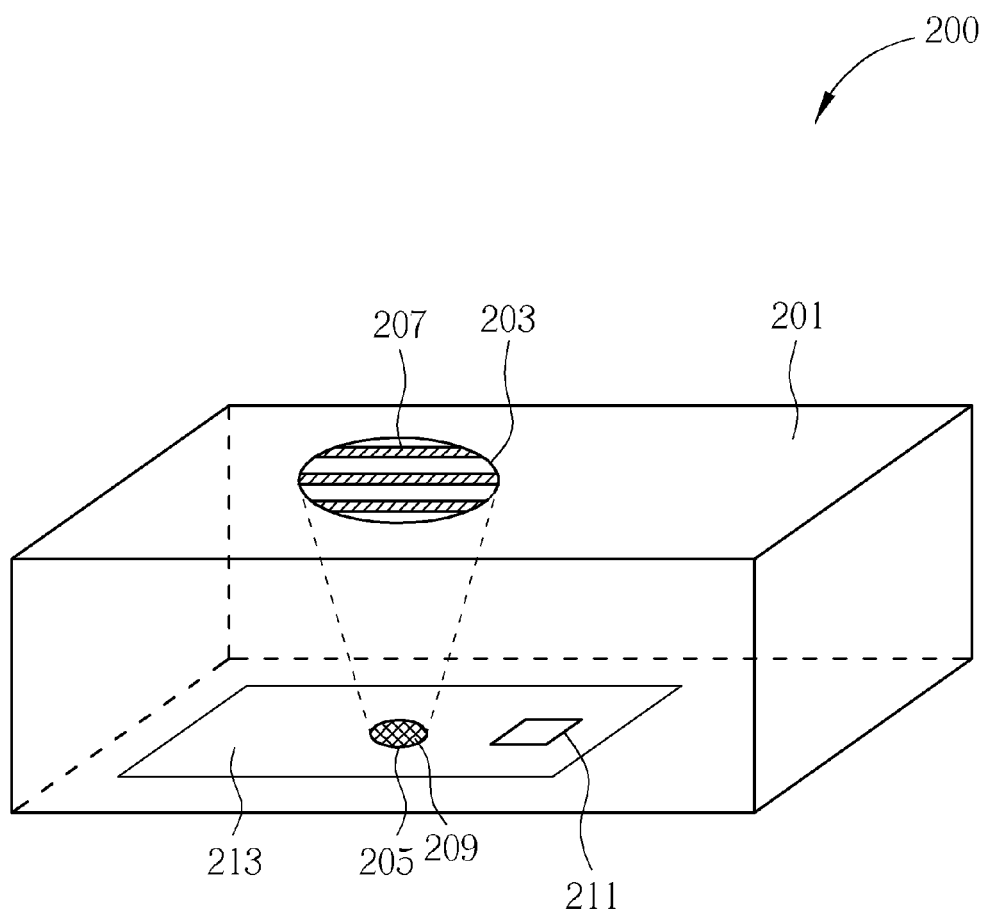
FIG. 2 is a schematic diagram illustrating structures for an optical tracking apparatus according to one embodiment of the present invention.

FIG. 2 is a schematic diagram illustrating structures for an optical tracking apparatus according to one embodiment of the present invention. The optical tracking apparatus 200 can be utilized to track an object providing light with specific frequency, such as the object 101 in FIG. 1. It should be noted that infrared light is taken for example as light with specific frequency, but does not mean to limit the concept of the present invention to infrared light.

As shown in FIG. 2, the optical tracking apparatus 200 can include: a housing 201, a lens 203, an image sensing chip 205, at least one of the light filtering devices 207, 209, a determining unit 211 and a circuit board 213. The lens 203 is on the housing 201. The image sensing chip 205 catches at least one image including object images for the object via the lens 203. The light filtering devices 207, 209 comprise at least one first region and at least one second region. Light passes through the first region and the second region to respectively generate a first region image area and a second region image area in the image caught by the image sensing chip 205. The first region can pass only infrared light, and the second region can pass not only infrared light but also light with other frequencies. The light with other frequencies here can indicate all light with other frequencies besides the infrared light, and also can indicate part of light with other frequencies besides the infrared light.

Figure 3:
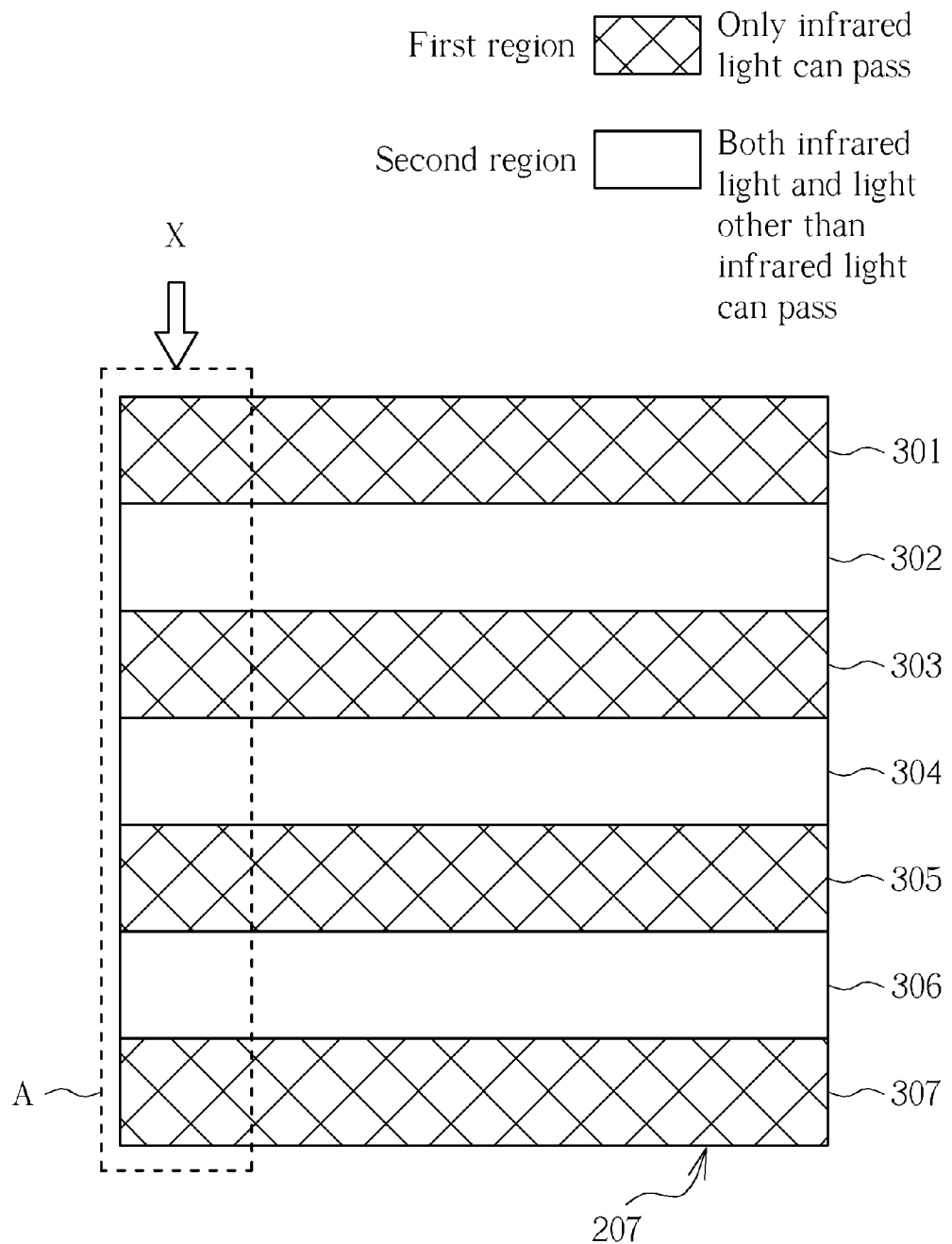
FIG. 3 and FIG. 4 are schematic diagrams illustrating the light filtering device, which can be applied to the optical tracking apparatus shown in FIG. 2, according to embodiments of the present application.
Figure 4:
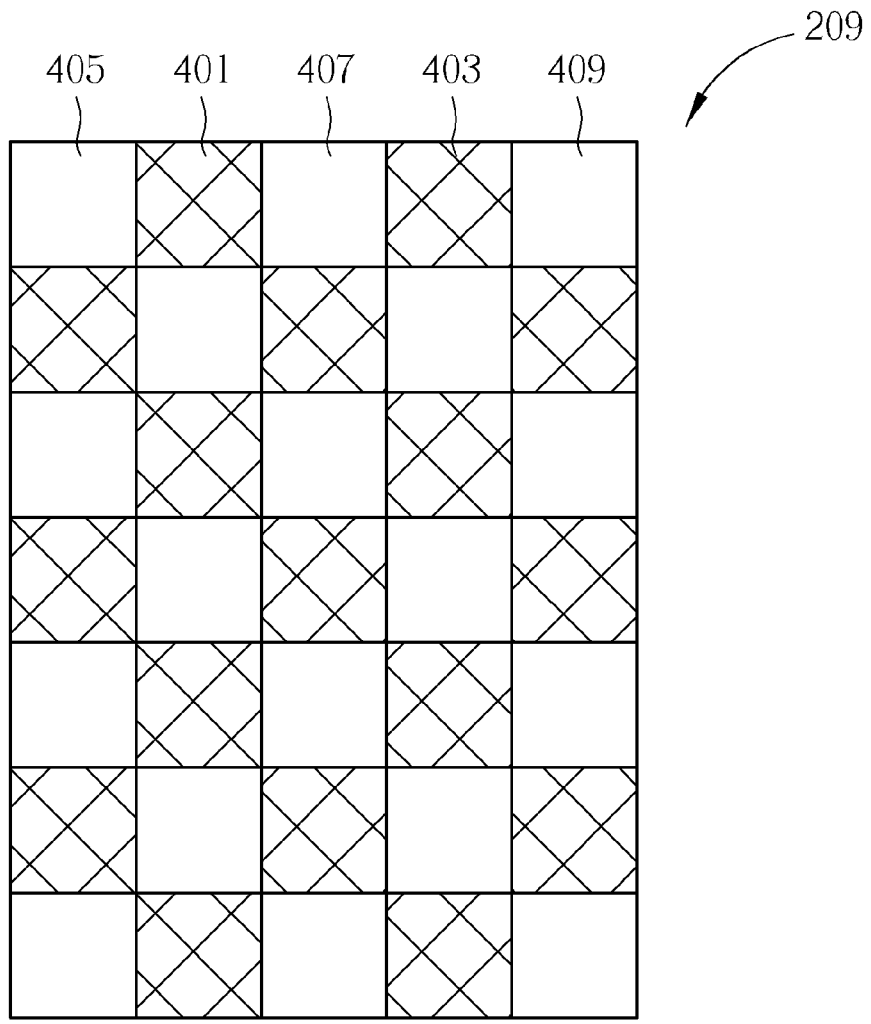

The arrangement for the first regions and the second regions can be arranged in various kinds of manners, depending on design for the optical tracking apparatus, or related image processing steps. Please refer to FIG. 3 and FIG. 4, which are schematic diagrams illustrating structures for the light filtering devices 207, 209 shown in FIG. 2. The light filtering device 207 shown in FIG. 3 is arranged in a bar manner and is provided on the lens 203. As shown in FIG. 3, the light filtering device regions 301, 303, 305 and 307 indicate the first regions that can pass infrared light. Also, the light filtering device regions 302, 304, and 306 indicate the second regions that can pass both the infrared light and the light other than infrared light. The light filtering device 209 shown in FIG. 4 is arranged in a chessboard manner and is provided on the image sensing chip 205. As shown in FIG. 4, the light filtering device regions 401, 403 indicate the first regions that can pass infrared light. Also, the light filtering device regions 405, 407, and 409 indicate the second regions that can pass both the infrared light and the light other than infrared light. Only part of the first regions and second regions in FIG. 4 are marked by symbols. Please note the above-mentioned arrangement and location for various kinds of light filtering devices are only for example and do not mean to limit the scope of the present invention. Additionally, the optical tracking apparatus 200 is not limited to include both the light filtering devices 207 and 209. The light filtering device 209 can be provided on the image sensing chip 205 via different methods, thus may have different thicknesses and may be formed by different materials. Therefore, if the image sensing chip 205 has the function of light filtering, it can be regarded as an image sensing matrix. The image sensing matrix has at least one first region and at least one second region. The first region can pass only light with a specific frequency. The second region can pass not only light with the specific frequency but also light with other frequencies. In this case, the determining unit 211 determines if the light source is the specific type light source, according to luminosity that the light source respectively generates for the first region and the second region.

The determining unit 211 determines a location for the object image for the object in the image, according to luminosity for the first region image area and the second region image area. That is, the determining unit 211 checks if the received light source is real the object to be tracked based on luminosity for the first region image area and the second region image area, to more precisely determine a location for the object image for the object in the image.

Both software and hardware can be utilized to implement the determining unit 211. For example, the determining unit 211 can be an independent circuit provided with the image sensing chip 205 on the circuit board 213. Also, a determining program can be written to a main controller (not illustrated) of the optical tracking apparatus 200 to implement the determining unit 211. Alternatively, the determining program can be written to the image sensing chip 205 to share the same hardware with image sensing operation. The examples for how the determining unit 211 determines which one is the real object to be tracked based on luminosity for the first region image area and the second region image area will be described as below.

A difference between the luminosity for the first region and the second region is less than a threshold value if the light from the light source to be determined includes only infrared light, since the light can pass both the first region and the second region. Therefore a difference between the luminosity for the first region image area and the second region image area is also less than a threshold value. The determining unit 211 can accordingly determine the light source is infrared light and may be the object to be tracked. On the contrary, the light generates no luminosity for the first region passing only infrared light and generates luminosity for the second region, if the light to be tracked includes no infrared light. Therefore, the determining unit 211 can determine the light source is not the object to be tracked according to the light source generates luminosity for the first region or the second region, or according to the luminosity difference between the first region and the second region is larger than a threshold value. That is, the determining unit 211 determines the object image is a real image, when a difference for luminosity that the object image generates for the first/second region image areas is smaller than a predetermined value, and computes location information for the object according to the location for the object image in the image.

Moreover, if the object to be tracked includes few amount of other light besides the infrared light, the object can still be determined if it is the one to be tracked via setting a proper threshold value. For example, a proper threshold value can be acquired via experiments, such that the light source to be determined can still be determined to the object to be tracked if the luminosity difference between first/second region image areas is less than this threshold value, even if the light source to be determined have other light besides the infrared light. Therefore, the scope of the present invention is not limited to determine infrared light and light including no infrared light.

Additionally, in one embodiment, the image scanning direction of the image sensing chip 205 is perpendicular to the first region and the second region of the light filtering device 207, that is, the X direction in FIG. 2. By this way, the images corresponding to the first region and the second region can be simultaneously scanned to compute luminosity for different regions. Also, a scanning region A is utilized for each scanning operation of the image sensing chip 205. However, the computing may be too complex or the determination may have error, if the noise source distribution is close and the scanning region A is too large. On the contrary, if the noise light source distribution for a specific region is few and scattered, scanning operations need to be performed for many times to determine the object to be tracked, if the scanning region A is too small, such that power consumption increases. Therefore, in one embodiment the image sensing chip 205 can detect a number of light sources in one image, and adjusts a scan frequency or a scan area for a scan operation thereof according to the number, to increase efficiency thereof.

Please not the optical tracking apparatus 200 can be utilized only as a light source determining apparatus to determine if the light source to be determined is the specific type light source (infrared light or noise light), and does not perform the object tracking operation. The image sensing chip 205 can be removed if the optical tracking apparatus 200 is utilized only as a light source determining apparatus. That is, the light source determining apparatus according to the present invention can include only the light filtering device and the determining unit. The light filtering device comprises at least one first region and at least one second region. The first region can pass only infrared light, and the second region can pass not infrared light but also light with other frequencies. The determining unit determines if the light source is the infrared light, according to luminosity that the light source respectively generates for the first region and the second region. Utilizing the image sensing chip to provide images is one of the methods for the determining unit to determine the luminosity for the first region and the second region, but does not mean to limit.

Figure 5:
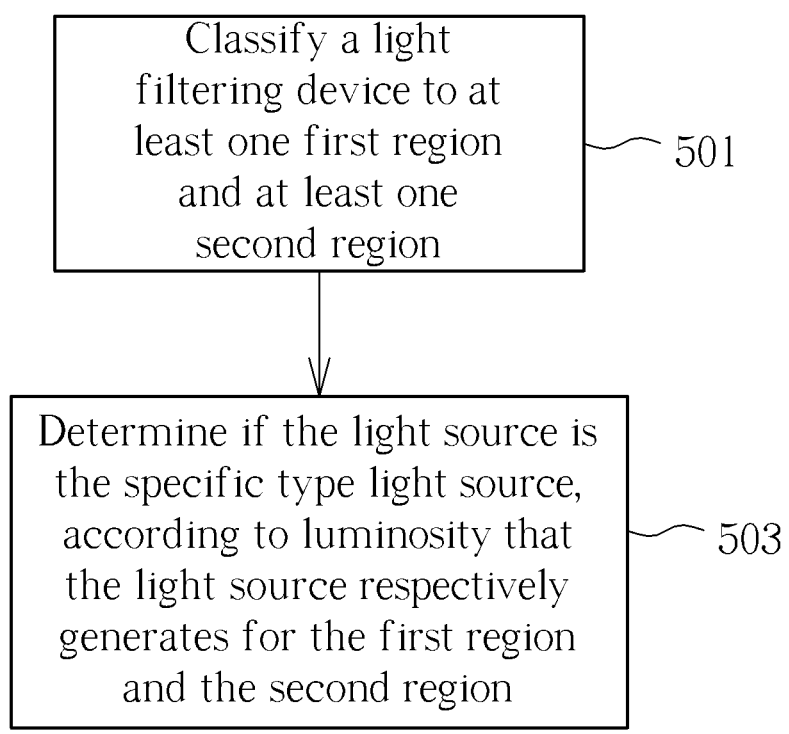
FIG. 5 is a flow chart illustrating a light source determining method according to one embodiment of the present invention.

A light source determining method can be acquired in view of above-mentioned embodiments. FIG. 5 is a flow chart illustrating a light source determining method according to one embodiment of the present invention, which includes following steps:

Step 501

Classify alight filtering device to at least one first region and at least one second region, wherein the first region can pass only light with a specific frequency (i.e. the above-mentioned infrared light), where the second region can pass not only light with the specific frequency but also light with other frequencies.

Step 503

Determine if the light source is the specific type light source, according to luminosity that the light source respectively generates for the first region and the second region. For example, determining if the light source emits light with specific frequency or the light source is another kind of light source.

Other detail steps can be acquired based on above-mentioned embodiments, thus it is omitted for brevity here.

In view of above-mentioned embodiments, simple structure can be utilized to determine the light source type, to accurately track an object. Additionally, the light source type determining operation can be more effective via adjusting the image scanning frequency and scanning area.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A light source determining apparatus, for determining if a light source is a specific type light source, comprising:
    a light filtering device, comprising at least one first region and at least one second region, wherein the first region can pass only light with a specific frequency range, where the second region can pass not only light with the specific frequency range but also light with other frequencies; and
    a determining unit, for determining if the light source is the specific type light source, according to luminosity that the light source respectively generates for the first region and the second region;
    an image sensing chip, for sensing an image generated by the light source, wherein the image comprises a first image region area generated via the first region and a second image region area generated via the second region, wherein at least one pixel of the first image region area is adjacent to at least one pixel of the second image region area;
    wherein the determining unit determines if the light source is the specific type light source according to a relation between a luminosity difference and a threshold value, wherein the luminosity difference is difference between a luminosity for the pixel of the first image region area and a luminosity for the pixel of the second image region area which is adjacent to the pixel of the first image region area.

2. The light source determining apparatus of claim 1, wherein the determining unit determines if the light source is the specific type light source according to if the light source generates any luminosity for the first region and the second region.

3. The light source determining apparatus of claim 1, wherein the light source only emits the light with the specific frequency range.

4. The light source determining apparatus of claim 3, wherein the light with the specific frequency range is infrared light.

5. The light source determining apparatus of claim 1, wherein the first region and the second region are arranged in a chessboard manner on the light filtering device.

6. The light source determining apparatus of claim 1, wherein the first region and the second region are arranged in a bar manner on the light filtering device.

7. The light source determining apparatus of claim 1, wherein a scan direction of the image sensing chip is perpendicular to the first region and the second region.

8. The light source determining apparatus of claim 1, wherein the image sensing chip further detects a number of light sources in one image, and adjusts a scan frequency or a scan area for a scan operation thereof according to the number.

9. An optical tracking apparatus, for tracking an object providing light with a specific frequency range, comprising:
    a housing;
    a lens, on the housing;
    a image sensing chip, for catching at least one image including object images for the object;
    a light filtering device, comprising at least one first region and at least one second region, wherein light passes through the first region and the second region to respectively generate a first region image area and a second region image area in the image caught by the image sensing chip, where the first region can pass only light with a specific frequency range, and the second region can pass not only light with the specific frequency range but also light with other frequencies, wherein the image comprises a first image region area generated via the first region and a second image region area generated via the second region, wherein at least one pixel of the first image region area is adjacent to at least one pixel of the second image region area; and
    a determining unit, for determining a location for the object image for the object in the image, according to luminosity for the first region image area and the second region image area;
    wherein the determining unit determines the object image is a real image, when a difference between a luminosity for the pixel of the first image region area and a luminosity for the pixel of the second image region area which is adjacent to the pixel of the first image region area is smaller than a predetermined value, and computes location information for the object according to the location for the object image in the image.

10. The optical tracking apparatus of claim 9, wherein the determining unit determines the location for the object image for the object in the image according to if any luminosity is generated to the first/second region image areas.

11. The optical tracking apparatus of claim 9, wherein the light source only emits the light with the specific frequency range.

12. The optical tracking apparatus of claim 11, wherein the light with the specific frequency range is infrared light.

13. The optical tracking apparatus of claim 9, wherein the first region and the second region are arranged in a chessboard manner on the light filtering device.

14. The optical tracking apparatus of claim 13, wherein the light filtering device is located on the image sensing chip.

15. The optical tracking apparatus of claim 9, wherein the first region and the second region are arranged in a bar manner on the light filtering device.

16. The optical tracking apparatus of claim 15, wherein the light filtering device is located on the lens or the image sensing chip.

17. The optical tracking apparatus of claim 15, wherein a scan direction of the image sensing chip is perpendicular to the first region and the second region.

18. The optical tracking apparatus of claim 15, wherein the image sensing chip further detects a number of light sources in one image, and adjusts a scan frequency or a scan area for a scan operation thereof according to the number.

19. A light source determining method, for determining if a light source is a specific type light source, comprising:
classifying a light filtering device to at least one first region and at least one second region, wherein the first region can pass only light with a specific frequency range, where the second region can pass not only light with the specific frequency range but also light with other frequencies; and
sensing an image generated by the light source, wherein the image comprises a first image region area generated via the first region and a second image region area generated via the second region, wherein at least one pixel of the first image region area is adjacent to at least one pixel of the second image region area;
determining if the light source is the specific type light source according to a relation between a luminosity difference and a threshold value, wherein the luminosity difference is difference between a luminosity for the pixel of the first image region area and a luminosity for the pixel of the second image region area which is adjacent to the pixel of the first image region area.

20. The light source determining method of claim 19, further comprising:
determining if the light source is the specific type light source according to if the light source generates any luminosity for the first region and the second region.

21. The light source determining method of claim 19, wherein the light source only emits the light with the specific frequency range.

22. The light source determining method of claim 21, wherein the light with the specific frequency range is infrared light.

23. The light source determining method of claim 19, wherein the first region and the second region are arranged in a chessboard manner on the light filtering device, wherein the light source determining method further comprises:
scanning an image to compute the luminosity that the light source generates for the first region and the second region, wherein a scan direction of the scanning is perpendicular to the first region and the second region.

24. The light source determining method of claim 23, further comprising:
detecting a number of light sources in one image, and adjusting a scan frequency or a scan area for a scan operation thereof according to the number.

25. An optical tracking apparatus, for tracking an object providing light with a specific frequency range, comprising:
a housing;
a lens, on the housing;
a image sensing chip, for catching at least one image including object images for the object;
a light filtering device, comprising at least one first region and at least one second region, wherein light passes through the first region and the second region to respectively generate a first region image area and a second region image area in the image caught by the image sensing chip, where the first region can pass only light with a specific frequency range, and the second region can pass not only light with the specific frequency range but also light with other frequencies, wherein the image comprises a first image region area generated via the first region and a second image region area generated via the second region, wherein at least one pixel of the first image region area is adjacent to at least one pixel of the second image region area; and
a determining unit, for determining a location for the object image for the object in the image according to a relation between a luminosity difference and a threshold value, wherein the luminosity difference is difference between a luminosity for the pixel of the first image region area and a luminosity for the pixel of the second image region area which is adjacent to the pixel of the first image region area.

* * * * *